United States Patent [19]

Gaines et al.

[11] 4,085,832
[45] Apr. 25, 1978

[54] MULTI-CHAMBERED FOAM ENERGY ABSORBER

[75] Inventors: Donald Raymond Gaines, Farmington, Mich.; Bronco Felex Jelenic, deceased, late of Ann Arbor, Mich., by Ronald B. Jelenic, administrator

[73] Assignee: Gulf & Western Manufacturing Company, Southfield, Mich.

[21] Appl. No.: 760,268

[22] Filed: Jan. 18, 1977

Related U.S. Application Data

[63] Continuation-in-part of Ser. No. 577,277, May 14, 1975, abandoned.

[51] Int. Cl.² ............................................. F16F 9/30
[52] U.S. Cl. ............................... 188/268; 267/63 R; 267/140; 293/86
[58] Field of Search .......... 188/1 B, 1 C, 268; 267/63 R, 9 B, 9 C, 134, 139, 140, 141; 293/70, 85, 86, 88

[56] References Cited

U.S. PATENT DOCUMENTS

| | | | |
|---|---|---|---|
| 2,670,200 | 2/1954 | Seddon | 267/63 R |
| 3,455,546 | 7/1969 | Shanok et al. | 267/141 |
| 3,537,696 | 11/1970 | Webster | 267/63 R |
| 3,574,379 | 4/1971 | Jordan | 267/140 |
| 3,865,417 | 2/1975 | Zwickl | 293/88 |
| 3,876,082 | 4/1975 | Fehl et al. | 267/140 |
| 3,891,200 | 6/1975 | Schwarz | 293/88 |

FOREIGN PATENT DOCUMENTS

| | | | |
|---|---|---|---|
| 2,219,916 | 10/1973 | Germany | 267/140 |
| 1,904,668 | 8/1970 | Germany | 267/140 |
| 2,354,856 | 5/1975 | Germany | 267/141 |

*Primary Examiner*—Trygve M. Blix
*Assistant Examiner*—Edward R. Kazenske
*Attorney, Agent, or Firm*—Meyer, Tilberry & Body

[57] ABSTRACT

A shock absorber has a cylindrical housing which encloses a plurality of axially aligned chambers. Each chamber is defined by two distinct partition walls disposed perpendicular to the axis of the housing. One partition wall of each chamber is axially fixed and the other is axially displaceable relative thereto. Each chamber is filled with a pad or pads of compressible foamed plastic material, and pads of material having different densities are disposed in each chamber or in different ones of the several chambers.

6 Claims, 9 Drawing Figures

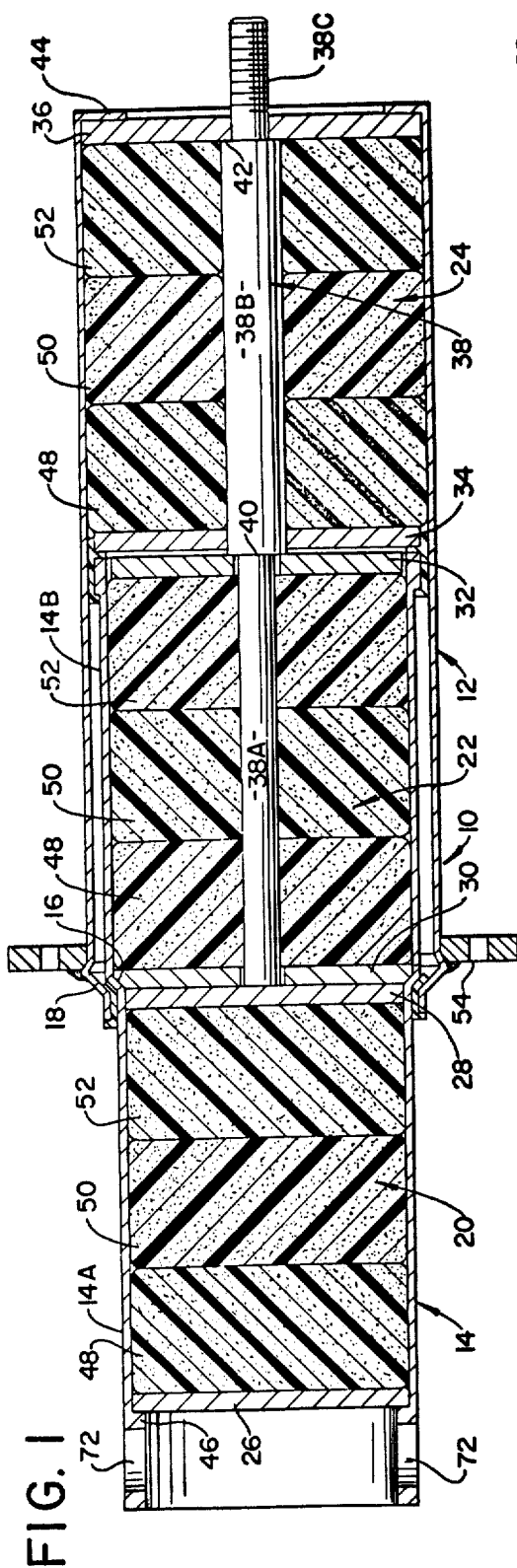
FIG. I
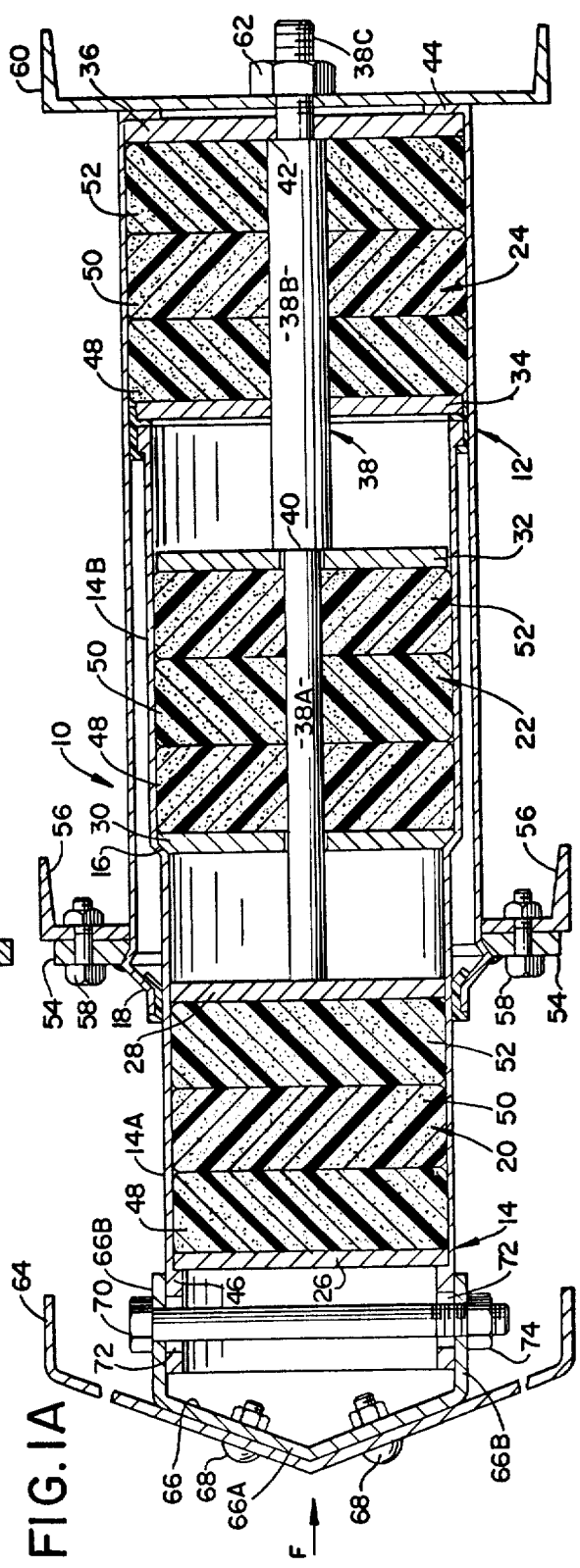
FIG. IA

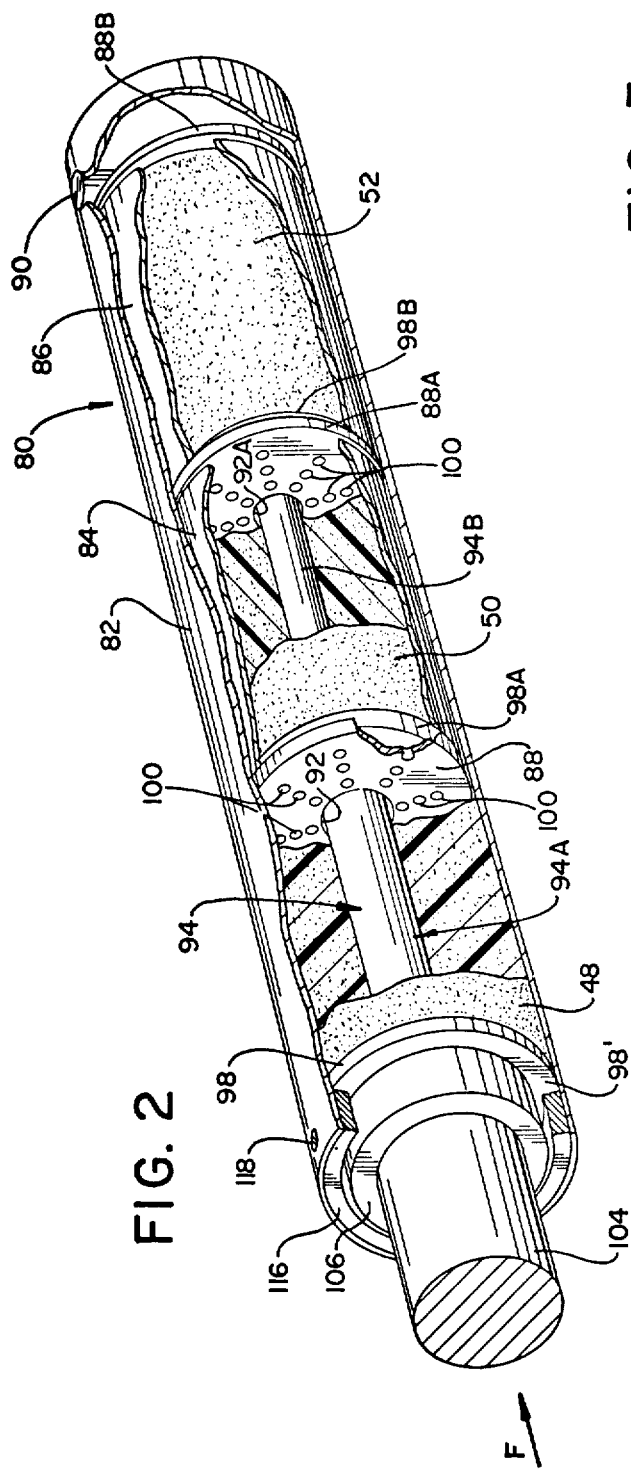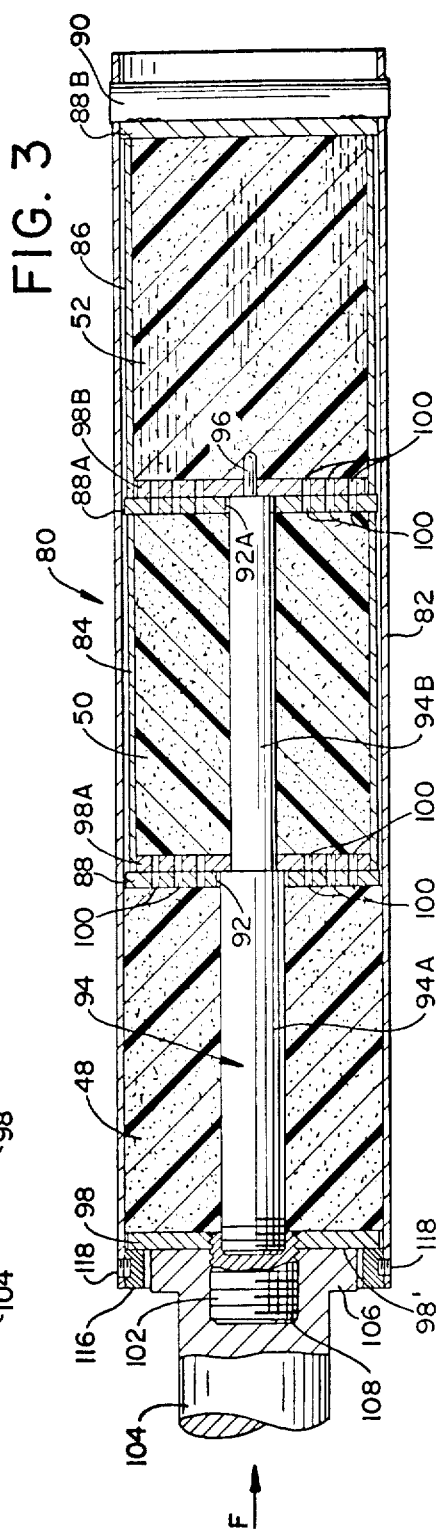

MULTI-CHAMBERED FOAM ENERGY ABSORBER

This application is a continuation-in-part of application Ser. No. 577,277 filed May 14, 1975 and now abandoned.

The present invention relates to the art of shock absorbers and, more particularly, to shock absorbers adapted for use as components of an impact absorbing vehicle bumper.

Specifically, the invention is applicable to shock absorbing bumpers for vehicles such as automobiles and will be described with reference thereto, although it will be appreciated that the invention has broader applications.

In recent years, increasing concern has developed over the protection afforded to vehicles and their occupants by the bumpers conventionally employed. Usually vehicle bumpers, particularly automobile bumpers, are nothing more than formed steel members which provide very little protection for the structure of the vehicle upon collision and almost none insofar as reducing the likelihood of injury to the occupants of the vehicle. Bumpers which employ shock absorbers and afford some degree of shock absorption upon impact, at least at very low collision speeds on the order of up to 5 miles per hour, have been developed to meet the need for more efficient energy absorption upon impact.

One of the difficulties inherent in providing shock absorbing characteristics to vehicle bumpers is that the size and weight of a bumper is limited by considerations of design and economy, so that it is difficult to attain the required degree of protection within the confines of usual design and economic parameters. The optimum device should perform its function reliably and consistently over a wide range of environmental conditions, while being physically compact, lightweight, and easily and economically manufactured.

The use of solid foamed plastic materials, such as polyurethane foamed plastic, as an energy absorbing component is well known. These materials provide the advantages of low cost, good energy absorbing characteristics and durability, which makes them desirable for use in shock absorbers in general. However, major problems arise with their use, in that the mechanical and shock absorbing properties of such foamed plastic materials vary considerably with temperature and do not retain their high energy absorbing qualities over a sufficiently broad range of ambient temperatures. In operation the shock absorber must perform reliably and consistently over ambient temperatures which range from below zero during the winter, to over 100° F in midsummer. A given foam designed for optimum shock absorbing capabilities at a given temperature may have vastly reduced absorption capacity at a temperature significantly different from the designed temperature.

A further difficulty arises from the peculiar nature of the impact forces which vehicle bumpers encounter and must effectively deal with. The bumper must dissipate extremely large amounts of kinetic energy in a brief moment of time and with only a relatively small compressional displacement. Solid foamed plastic materials which meet the requirement of temperature insensitivity invariably have much lower energy absorption capabilities per volume, therefore an excessive amount of this plastic is required to meet these high energy absorption requirements.

The present invention overcomes these difficulties through use of a plurality of chambers disposed substantially along the line of action of the applied impact force. Each chamber contains one or more cores composed of foamed plastic materials. Impact forces are transmitted either simultaneously or sequentially to these cores, thus compressing them against the stationary end walls of each chamber. This arrangement spreads the force of impact over a larger surface area, thus minimizing the possibility of failure of the energy absorbing material and providing compression of a large volume of foam material with relatively small bumper displacement. A plurality of foamed plastic materials are used either in each chamber or in separate chambers. Through choice of foam materials whose temperature characteristics differ, a shock absorber is produced whose energy absorption characteristics, reflecting the additive effect of the individual foam materials, is consistent over the temperature range desired.

Unlike pneumatic shock absorbers, this invention does not require close fitting seals or precision manufacture of any of its elements and thus may be produced easily and economically.

It is accordingly an object of the present invention to overcome at least some of the difficulties of prior art designs by providing a shock absorber of multi-chamber design which permits transmitting the force of impact to a plurality of shock absorbing chambers either simultaneously or, in another embodiment of the invention, sequentially.

It is also an object of this invention to provide an improved and simple shock absorber design which is particularly adaptable for utilization in a shock absorbing vehicle bumper.

It is another object of the invention to provide a shock absorber capable of receiving impact forces sequentially in a plurality of chambers, thereby permitting selective variations in the overall shock absorber performance characteristics.

It is still another object of this invention to provide a shock absorber utilizing a plurality of energy absorbing materials such that the resultant overall characteristics of the invention, reflective of the additive effect of such materials, may be tailored as desired.

It is still another object of this invention to provide a shock absorber utilizing a plurality of energy absorbing materials each having a different density and thus different energy absorbing characteristics depending on temperature and which characteristics provide for the shock absorber to have a more uniform energy absorbing capability over a wide temperature range than would be possible with any one of the materials alone.

The invention may take physical form in certain parts and arrangement of parts, specific embodiments of which are shown in the attached drawings which form a part hereof and wherein:

FIG. 1 is a sectional view taken along the longitudinal axis of a preferred embodiment of the invention, showing the device in an unstressed state;

FIG. 1A is a view corresponding to FIG. 1 showing the device mounted on a vehicle and under impact conditions;

FIG. 2 is a perspective view, partially broken away, of another embodiment of the present invention;

FIG. 3 is a sectional view taken along the longitudinal axis of the device of FIG. 2, showing the device in an unstressed state;

Figure 3A:
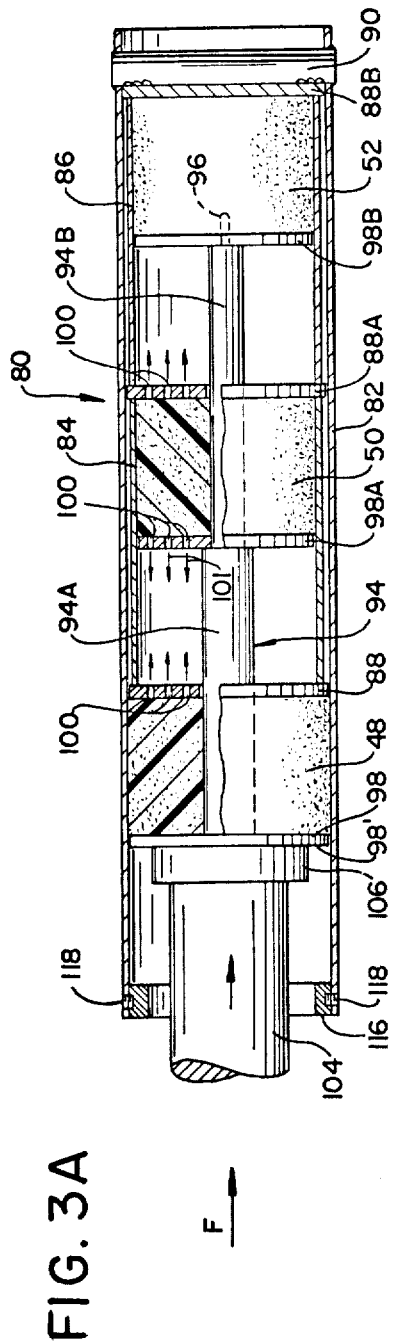
FIG. 3A is a view corresponding to FIG. 3 but in smaller scale, showing the shock absorbing device of FIG. 3 under the imposition of impact forces.

Referring now to the drawings in detail, FIGS. 1 and 1A illustrate a preferred embodiment of the invention, indicated generally by number 10. A cylinder 12 slidably receives a piston 14 of slightly smaller diameter. Piston 14 and cylinder 12 are of substantially similar longitudinal lengths and are received one within the other to the extent of one-half of each of their lengths. The ends of the device are thus defined by partition wall 26 closing the outer end of piston 14 and partition wall 36 closing the outer end of cylinder 12.

Piston 14 comprises two linearly adjacent tubular sections, 14A and 14B, of dissimilar diameter and similar length. Interior section 14B is transversely dimensioned so as to be closely received by cylinder 12. Exterior section 14A is of slightly smaller diameter such that a step 16 is formed at its junction with interior section 14B. The interior end 18 of cylinder 12 is rolled slightly inwardly so as to abut step 16. The piston 14 is thus confined from further outward extension from cylinder 12 by the rolled interior end 18 of cylinder 12.

The interior space of the device is divided into three chambers, to wit: chamber 20 emcompassed only by piston 14, chamber 22 encompassed by both cylinder 12 and piston 14, and chamber 24 encompassed only by cylinder 12. Chamber 20 has opposite ends defined by partition walls 26 and 28. Chamber 22 has opposite ends defined by partition walls 30 and 32, and chamber 24 has opposite ends defined by partition walls 34 and 36.

Partition walls 30, 32, 34 and 36 are apertured to receive a support rod 38 which extends longitudinally along the axis of the device through chambers 22 and 24. Support rod 38 is constructed so as to include three sections of differing diameters 38A, 38B and 38C. Section 38A abuts partition wall 28 and extends through the closely fitting partition wall 30 and extends through the closely fitting aperture in partition wall 32. Section 38B is of somewhat greater diameter than section 38A such that a step 40 is created at its junction with section 38A, which step abuts partition wall 32. Support rod 38B is slidably received by the aperture in partition wall 34 and extends through chamber 24. Support rod section 38C is of the same diameter as section 38A such that step 42, similar to step 40, is created at its junction with support rod section 38B. Step 42 abuts partition wall 36. Support rod section 38C extends through the closely fitting aperture in wall 36 and thus beyond the body of the device. The exterior end of cylinder portion 12 is rolled inwardly creating a flange 44 against which the exterior face of partition wall 36 abuts.

Wall 26 has substantially the same diameter as the interior diameter of piston section 14A and abuts interior flange 46. Partition wall 30 has substantially the same diameter as the interior diameter of piston section 14B and abuts the interior face of step 16. Partition wall 34 has substantially the same diameter as the exterior diameter of piston section 14B and abuts the end thereof. It will be appreciated from the foregoing description that partition walls 28, 32 and 36 of the chamber are fixed and that partition walls 26, 30 and 34 are axially displaceable relative thereto and have peripheral edges slidably engaging the corresponding cylindrical chamber wall.

Chambers 20, 22 and 24 each contain a plurality of shock absorbing cores 48, 50 and 52, which are concentrically disposed and fill the respective chamber. The unit may be preloaded through the use of axially oversized cores which are then compressed slightly upon assembly of the unit. This preload helps to quickly return the device to the unloaded position, keeps the unit from rattling, and helps raise the efficiency of the energy dissipation curve of the device. These cores are composed of a foamed plastic material which preferably is foamed polyurethane. Preferably a plurality of polyurethane materials are used which together provide for the shock absorber to be more temperature stable and to provide more uniform shock absorbing characteristics over a wide temperature range of expected use than is possible with a single material. In this respect, it will be appreciated that a given polyurethane material has physical characteristics which vary with temperature changes such that the shock absorbing characteristics in response to a given load on the shock absorber assembly will vary depending on the ambient temperature. Generally, if the shock absorber is to be used as a component of an automobile bumper, it may be expected to be subject to temperatures ranging from −10° to 110° F. In accordance with the present invention, shock absorbing materials are employed which will provide more uniform shock absorbing characteristics within this wide temperature range. In the preferred embodiment this is achieved by employing pads of polyurethane having different densities and, more specifically, pads of material having densities of 10, 20 and 37 lbs./ft$^3$. For example, in the structural embodiment shown, pads 48, 50 and 52 would be polyurethane pads of the same composition having densities of 10, 20 and 37 lbs./ft$^3$, respectively. A suitable material for the pack is a foamed polyurethane available from the Mobay Chemical Company, Pittsburgh, Pa. under the trademark "TEXIN."

Referring now to FIG. 1A, the unit 10 is mountable on the vehicle by means of an annular mounting flange 54 which is affixed in any convenient fashion, such as welding, near the interior end 18 of cylinder 12. The mounting flange 54 is secured to vehicle frame member 56 by fastening member 58. The unit 10 is further secured to vehicle frame member 60 by the extending end support rod section 38C, which may conveniently be threaded to receive mounting nut 62.

The bumper 64 is mounted on the shock absorber unit 10 by means of a clevis 66, comprised of a base 66A and to similar leg members 66B. Mounting element 66 is rigidly affixed at its base 66A to bumper 64 by fastening means 68. Mounting element 66 is further connected to shock absorber 10 by means of a clevis pin 70 which extends through holes in leg members 66B. Piston exterior section 14A is received between leg members 66B such that clevis pin 70 extends transversely through apertures 72 on either side thereof. Clevis pin 70 is secured from movement by fastening means 74.

Application of force F to bumper 64 is transmitted by piston 14 through clevis pin 70, causing piston 14 to telescope into cylinder 12. Partition walls 26, 30 and 34 are integral with piston 14, as previously described, and are thus advanced with piston 14. Stationary partition walls 28 and 32 are constrained from movement with piston 14 by support rod 38, while stationary wall 36 is likewise constrained by the rolled exterior end 44 of cylinder 12. Therefore upon imposition of force F, partition walls 26, 30 and 34 close upon stationary walls 28, 32 and 36 causing either simultaneous or sequential compression of the cores contained within chambers 20, 22 and 24. For instance lost motion may be incorporated between chambers if sequential compression is desired, as pointed out more fully hereinafter. The natural resiliency of the cores acts to oppose the action of the piston, thus dissipating the energy of the impact force and retarding the motion of piston 14 within cylinder 12. Upon removal of force F, the cores within chambers 20, 22 and 24 react to regain their unstressed shapes, forcing piston 14 out of telescopic engagement with cylinder 12, thereby returning the piston 12 to its pre-impact position.

Referring now to FIGS. 2 and 3, another embodiment of the shock absorber of the present invention is generally indicated by the numeral 80. Shock absorber 80 includes a tubular housing 82, and a pair of spacer tubes 84 and 86 which are received within housing 82 to position and support axially fixed partition walls 88 and 88A. A partition wall 88B closes one end of housing 82 and is attached thereto by any suitable means, such as welding. A dowel pin 90 passes through housing 82 and is positioned adjacent partition wall 88B as reinforcement therefor. Dowel pin 90 may be secured to housing 82 by any suitable means such as welding, or the like.

Partition walls 88 and 88A, and end partition wall 88B, define the fixed end walls of a series of three chambers within housing 82. Partition walls 88 and 88A have central apertures 92 and 92A, respectively, which slidably receive an axially reciprocable piston rod 94. Piston rod 94 has a first section 94A, a smaller diameter second section 94B, and a tip end 96. Apertures 92 and 92A are dimensioned to slidably receive the corresponding piston rod portion. A partition wall 98 is suitably fixed on rod 94 adjacent the outer end of the rod and defines one of the chambers with fixed partition 88. A second partition wall 98A is apertured to receive rod 94 in abutting relationship with the shoulder between rod sections 94A and 94B. Wall 98A is fixed on rod 94 and defines a second chamber with fixed partition 88A. A third partition wall 98B apertured to receive rod tip 96 is suitably attached to the rod, whereby the third chamber is defined by partition walls 98B and 88B. It will be appreciated that each movable partition 98, 98A and 98B has a peripheral edge slidably engaging the inner surface of, respectively, housing 82, sleeve 84 and sleeve 86 defining the inner surface of the corresponding chamber sidewall.

A series of perforations 100 may be formed in partition walls 88, 88A, 98A and 98B in order to permit the passage of liquid therethrough upon compression and release of compression forces on the shock absorbing material. A threaded connector 102 is fixed to the outer end of piston rod 94. A shaft member 104 includes a base portion 106 having a threaded aperture 108 formed therein to receive connector 102, thereby securing piston rod 94 to shaft 104.

As in the previously described embodiment, the three interior chambers are filled with pads of foamed plastic material, shown here in the mode wherein each chamber is filled with a single pad of material and each pad has a different density. Thus, cylindrical shock absorbing cores 48, 50 and 52 having densities of 10, 20 and 37 lbs./ft$^3$ are positioned, respectively, within the chambers formed within housing 82 between partition walls 98 and 88, 98A and 88A, and 98B and 88B.

The shock absorber assembly is completed by a retaining ring 116 which is held in place by set screws 118. When assembled, the base portion 106 of shaft member 104 abuts the exterior face 98' of piston wall 98. The shock absorber is assembled and mounted for use so that impact forces are imposed upon shaft member 104 in the direction of arrow F in FIGS. 2 and 3. Upon the imposition of shock forces in this direction, piston rod 94 advances through partition walls 88 and 88A so that shock absorber cores 48, 50 and 52 are compressed simultaneously. More particularly, as best seen in FIG. 3A, impact forces imposed in the direction of arrow F advance piston rod 94, together with partition walls 98, 98A and 98B towards the right. Partition walls 88, 88A and 88B are restrained from motion relative to housing 82 by spacer tubes 84 and 86 and dowel 90. Accordingly, shock absorbing cores 48, 50 and 52 are compressed against partition walls 88, 88A and 88B, respectively.

When the impact forces are relieved, the natural resiliency of shock absorbing cores 48, 50 and 52 causes them to recover to their original shapes, which in turn forces piston rod 94 leftwardly until piston rod 94 returns to its original, unloaded position. Retaining ring 116 serves as a stop against which the peripheral portion of exterior face 98' of partition wall 98 stops.

Shock absorbing cores 48, 50 and 52 may contain a viscous liquid in the interstices of the foamed plastic material which, under the compressive force imposed by the movable wall of the corresponding chamber will force the liquid out of the interstices thus doing additional work to help absorb the impact energy. The liquid with which the foamed plastic material is saturated may be any suitable liquid such as an oil, hydraulic fluid, a gel, a semi-liquid, a viscous silicon compound, water, water with an anti-freeze such as ethylene glycol contained therein, or any other suitable liquid. During compression of shock absorbing cores 48, 50 and 52, the liquid contained within the interstices of the foamed plastic material is expelled therefrom and passes throgh perforations 100 in partition walls 88 and 88A and partition walls 98A and 98B into the vacated portions of the respective chambers. The passage of the liquid through perforations 100 is shown by the arrows 101 in FIG. 3A. Upon the return stroke of piston rod 94 to its normal or rest position, the expelled liquid is forced in the opposite direction from that indicated by the arrows 101 back through perforations 100.

Thus, impact forces imposed upon shaft member 104 and thence piston rod 94, are resisted simultaneously by shock absorbing cores 48, 50 and 52. The capacity of these shock absorbing cores is enhanced by the viscous liquid contained therein both upon impact and rebound. The rebound action of piston rod 94, and hence shaft member 104, is attenuated by the liquid being forced through apertures 100.

Figure 4:
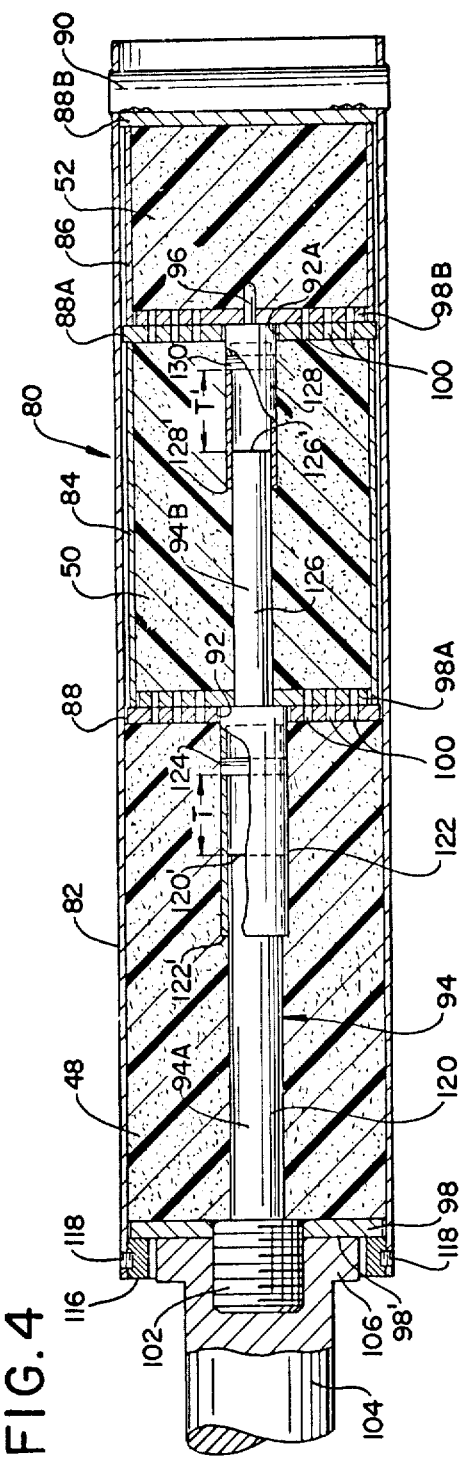
FIG. 4 is a view corresponding to FIG. 3 showing a third embodiment of the invention in an unstressed state; and, FIGS. 4A–4C are smaller scale views of the device of FIG. 4, showing the device in sequential stages of impact stress.

FIG. 4 shows an embodiment similar to FIGS. 2 and 3 but including a modification of piston rod 94 so as to provide sequential compression of shock absorbing material cores 48, 50 and 52. Aside from the modification to piston rod 94, the shock absorber shown in FIG. 4 is substantially identical to that shown in FIGS. 2, 3 and 3A, and corresponding or identical parts are identically numbered. Thus, the shock absorber device of FIG. 4 comprises a housing 82 having three chambers formed therein by interior partition walls 88 and 88A and end partition wall 88B. Spacer tubes 84 and 86 hold partition walls 88 and 88A in place, and a shaft 104 has a base portion 106 connected to piston rod 94.

In this embodiment, piston rod sections 94A and 94B are modified to provide lost motion connections with respect to movable partition walls 98A and 98B, respectively. More particularly, section 94A is of telescopic construction and includes two separate rod members 120 and 122. Rod member 120 is slightly smaller in diameter than rod member 122, the latter being hollow for at least a portion of its length from outer edge 122' so that rod member 120 is slidably received therein. A pin 124 passes through member 122 and is normally spaced from inner end 120' of rod member 120 to delimit the lost motion of rod member 120. Similarly, section 94B of piston rod 94 is of telescopic construction comprising two rod members 126 and 128. Member 126 is slidably received with member 128 which is hollow for at least a portion of its length from outer edge 128'. A pin 130 extends through member 128 and is normally spaced from inner end 126' of member 126 to delimit the lost motion of rod member 126.

In operation, an impact force represented by the arrows F in FIG. 4, and imposed upon shaft 104, will force piston wall 98 towards the right compressing shock absorbing core 48. Member 120 will travel within member 122 through a free travel distance T without imposing movement on member 122 or partition wall 98A. When inner end 120' of member 120 contacts pin 124, partition wall 98A is advanced towards the right to commence compression of shock absorbing core 50. Similarly, a free travel distance T' is provided between inner end 126' of member 126 and pin 130, so that compression of shock absorbing core 52 does not commence until rod member 126 advances a distance T'.

Figure 4A:
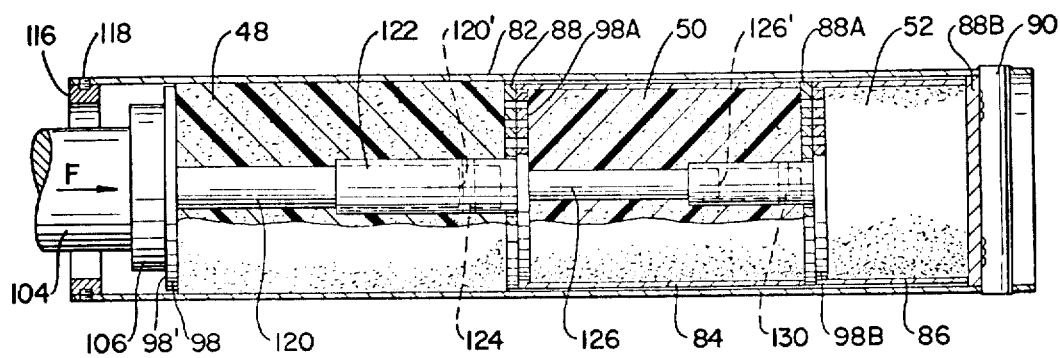
Figure 4B:
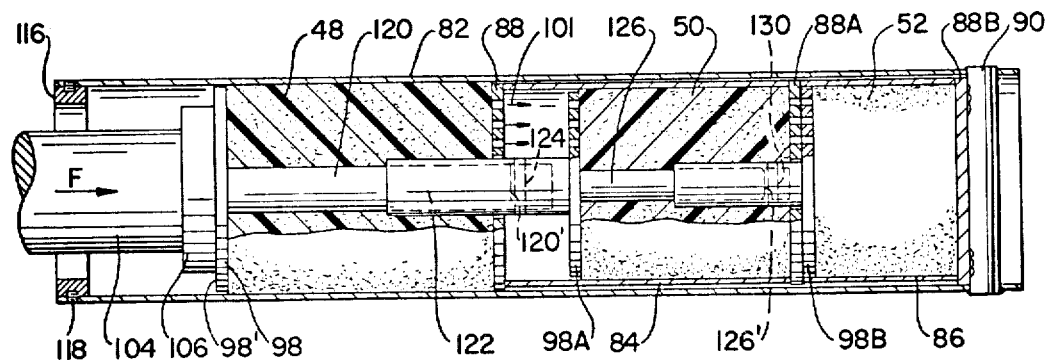
Figure 4C:
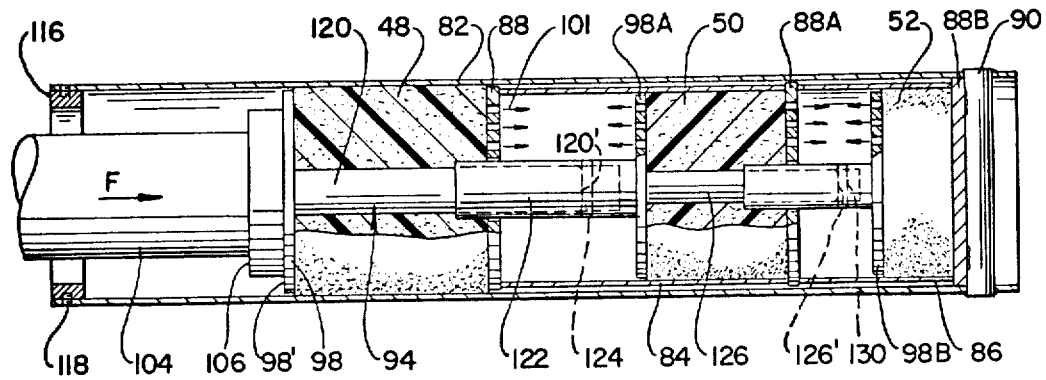

FIG. 4A shows schematically the compression of shock absorbing core 48 prior to travel of member 120 the distance T required to initiate compression of shock absorbing core 50. FIG. 4B shows compression at a point where rod member 120 has traveled a distance sufficient to initiate compression of core 50, but has not displaced rod member 126 the distance T' required to initiate compression of shock absorbing core 52. FIG. 4C shows a stage of compression wherein member 126 has travelled a distance greater than T', whereby all three shock absorbing cores are under compression.

If shock absorbing cores 48, 50 and 52 contain a liquid or fluid therein, the fluid is expelled through apertures 100 in the same manner as described with respect to the embodiment shown in FIGS. 2 and 2A. Arrows 101 in FIGS. 4A, 4B and 4C show the direction of fluid flow during impact movement of piston rod 94, i.e., travel which compresses shock absorbing cores 48, 50 and 52.

A similar sequential compression of the shock absorbing cores can be realized by machining radial shoulders on the piston rod sections 94A and 94B of FIGS. 2, 3 and 3A such that the shoulder at the end of each section does not meet its respective partition wall 98A or 98B until after some lost motion travel distance, such as distances T and T'. Such a modification would be accompanied by providing for the piston rod sections to be slidably received in the openings in partition walls 98A and 98B through which the rod portions extend. It will be appreciated that either of these methods of sequential compression is easily adapted to the embodiment illustrated in FIGS. 1 and 1A. For example, it will be appreciated that rod 94 in FIG. 4 could readily be substituted for rod 38 in FIG. 1. In this respect, the threaded end of rod 94 would be attached to partition 36 for the rod to extend coaxially of the male and female cylinders the same as rod 38. Partition 28 in FIG. 1 would abut against the inner end of rod member 128 to provide a lost motion travel distance T' as shown in FIG. 4, and partition 32 in FIG. 1 would abut against the inner end of rod member 122 to provide a lost motion distance T as shown in FIG. 4. Thus, upon inward telescoping movement of male cylinder 14, partition 34 first compresses the core of material in chamber 24. During this initial movement, partition 30, the material in chamber 22 and partition 32 move with cylinder 14 until the lost motion distance T is overcome to stop partition 32. Thereafter, the material in chamber 22 is compressed by further movement of cylinder 14 inwardly of cylinder 12. During initial compression of the material in chamber 22, the material in chamber 20 and partition 28 move with cylinder 14 until the lost motion distance T' is overcome to stop partition 28. Thereafter, further movement of cylinder 14 inwardly of cylinder 12 compresses the material in chamber 20.

While the invention has been described with respect to specific preferred embodiments it will be apparent to those skilled in the art, upon a reading and understanding of the foregoing description, that numerous modifications and alterations thereto may be made that are nonetheless within the spirit and scope of the within described invention. Accordingly, it is to be distinctly understood that the foregoing descriptive matter is to be interpreted merely as illustrative of the present invention and not as a limitation.

What is claimed is:

1. A shock absorber comprising a pair of telescoped male and female cylinders each having an outer end portion and a telescoped inner end portion; a rod within and coaxial with said cylinders, said rod being fixed relative to said female cylinder; each of said cylinders having an inner surface; a first chamber in the outer end portion of said male cylinder, a second chamber within the telescoped inner end portion of said male cylinder, a third chamber in the outer end portion of said female cylinder; said first chamber being defined by a first axial portion of the inner surface of said male cylinder, a first partition affixed to and closing the outer end of said male cylinder, and a second partition disposed slidably within said male cylinder, said second partition being fixed relative to said rod and said female cylinder and having a circumferential edge axially slidably engaging said first portion of said inner surface of said male cylinder; said second chamber being defined by a second axial portion of the inner surface of said male cylinder, a third partition fixed in said male cylinder inwardly adjacent said second partition, and a fourth partition fixed relative to said rod and said female cylinder inwardly of said third partition, said fourth partition having a circumferential edge axially slidably engaging said second portion of said inner surface of said male cylinder; said third chamber being defined by an axial portion of the inner surface of said female cylinder, a fifth partition fixed to and closing said telescoped inner end portion of said male cylinder, and a sixth partition fixed to and closing said outer end portion of said female cylinder, said fifth partition and telescoped inner end portion of said male cylinder having a circumferential edge axially slidably engaging said portion of said inner surface of said female cylinder; said rod having a first end fixed to said sixth partition and a second end disposed in said male cylinder, and compressible foamed plastic material filling each said first, second and third chambers radially to the corresponding inner surface portion of said cylinders defining said chambers and axially between the corresponding partitions of said chambers, inward movement of said male cylinder relative to said female cylinder simultaneously displacing said first, third and fifth partitions respectively toward said second, fourth and sixth partitions, whereby all said material in said first chamber is axially compressed between said first and second partitions, all said material in said second chamber is axially compressed between said third and fourth partitions and all said material in said third chamber is axially compressed between said fifth and sixth partitions.

2. The shock absorber according to claim 1, wherein said compressible material in each chamber is a plurality of axially aligned foamed plastic pads.

3. The shock absorber according to claim 2, wherein each pad of said plurality has a different density.

4. The shock absorber according to claim 1, wherein said telescoped inner end portions of said male and female cylinders are provided with matching detents to prevent axial disengagement of said cylinders.

5. The shock absorber according to claim 1, wherein said rod is radially stepped intermediate said first and second ends to provide a shoulder facing said outer end portion of said male cylinder, said second partition being disposed in abutting relationship with respect to said second end of said rod, said fourth partition surrounding said rod and abutting against said shoulder, and said third and fifth partitions being apertured to slidably receive said rod.

6. The shock absorber according to claim 5, wherein said compressible material in each chamber is a plurality of axially aligned foamed plastic pads, each pad of said plurality having a different density.

* * * * *